United States Patent [19]

Howard

[11] Patent Number: 5,366,767
[45] Date of Patent: Nov. 22, 1994

[54] COMPOSITION AND METHOD FOR PREVENTING MOSS GROWTH ON ROOFS

[76] Inventor: Richard Howard, 30311 Camas Swale Rd., Creswell, Oreg. 97426

[21] Appl. No.: 120,949

[22] Filed: Sep. 14, 1993

[51] Int. Cl.⁵ .......................... B05D 3/00; C09D 5/14
[52] U.S. Cl. ..................................... 427/294; 427/296; 427/297; 427/397.8; 427/421; 427/427; 427/430.1; 106/15.05; 106/18.32; 106/600; 106/634
[58] Field of Search .................. 106/18.12, 15.05, 634, 106/600, 18.32; 427/397.8, 427, 421, 297, 430.1, 294, 296

[56] References Cited

U.S. PATENT DOCUMENTS

| | | | |
|---|---|---|---|
| 55,216 | 5/1866 | Ransome | 427/297 |
| 3,180,746 | 4/1965 | Patton et al. | 106/623 |
| 3,721,574 | 3/1973 | Schneider et al. | 106/634 |
| 3,888,684 | 6/1975 | Little | 106/15.05 |
| 3,998,644 | 12/1976 | Lodge | 106/15.05 |
| 4,137,087 | 1/1979 | Blasko et al. | 106/634 |
| 4,179,535 | 12/1979 | Kalbskopf et al. | 427/206 |
| 4,272,935 | 6/1981 | Lukas et al. | 52/309.11 |
| 4,338,374 | 7/1982 | Neser | 106/634 |
| 4,432,798 | 2/1984 | Helferich et al. | 106/38.3 |
| 4,443,496 | 4/1984 | Obitsu et al. | 106/634 |
| 4,521,333 | 6/1985 | Graham et al. | 106/18.12 |
| 4,535,002 | 6/1985 | Kirkhuff | 427/203 |
| 4,612,050 | 9/1986 | Hicks | 106/18.12 |
| 4,710,309 | 12/1987 | Miller | 106/18.12 |
| 4,737,154 | 4/1988 | Gaines et al. | 427/440 |
| 4,879,066 | 11/1989 | Crompton | 252/606 |
| 4,886,548 | 12/1989 | Helmstetter | 106/634 |
| 5,060,445 | 10/1991 | Jong | 52/553 |

FOREIGN PATENT DOCUMENTS 2136824  9/1984  United Kingdom ............. 106/18.12

OTHER PUBLICATIONS

"Bonding and Coating Applications of PQ Soluble Silicates", The PQ Corporation Bulletin 12–31 (no date).
"Sodium Silicates Liquids/Solids", The PQ Corporation, Bulletin 17–103 (no date).
Product Bulletin from Van Waters & Rogers Inc., a subsidiary of Univar (no date).

*Primary Examiner*—Anthony Green
*Attorney, Agent, or Firm*—Kolisch, Hartwell, Dickinson, McCormack & Heuser

[57] ABSTRACT

A penetrant composition for applying to and penetrating into weather exposed surface materials to prevent moss growth thereon is described. The composition is an aqueous solution containing $Na_2O$, $SiO_2$ and a surfactant for increasing the permeability of the composition into the surface material. A method of protecting weather exposed surface material from moss growth thereon is also described. The method involves the steps of providing a composition including water, $Na_2O$, $SiO_2$ and a surfactant. Approximately 1 gallon of the composition is applied per 100 square feet of surface to be protected. The composition is allowed to dry on and in the surface material at ambient temperatures.

15 Claims, No Drawings

5,366,767

COMPOSITION AND METHOD FOR PREVENTING MOSS GROWTH ON ROOFS

FIELD OF THE INVENTION

The invention relates to a penetrant composition and method of using the composition to prevent moss growth on roofs. More specifically, the invention involves an aqueous composition containing $Na_2O$ and $SiO_2$ which is applied and allowed to penetrate into porous weather exposed material to prevent moss growth.

BACKGROUND OF THE INVENTION

Roofing and other weather exposed materials are exposed to the effects of sunlight and moisture resulting in physical and chemical changes, commonly called weathering. Initially, weathering results from the sun's ultraviolet rays which dull the color of the roof material, generally lightening the color of the roof. Gradually, the roof is colonized by microfungi which darkens the color of the roof material. As the roof continues to age, the surface and sharp edges of the roof are eroded by continued exposure to heat and cold and from abrasive particles carried by wind and rain. Roof material destroying organisms, such as moss, further degrade the roof's surface and edges. Loose debris from trees may begin to accumulate on the roof, particularly in recesses such as between shakes or tiles and in bends or corners of the roof. After each rain, these areas remain moist for a longer time than roof areas exposed to direct sunlight. Because of these moist conditions, moss growth is increased.

Moss damages the roofs in at least two ways. First, during a rain, the moss retards the shedding of water, which promotes leaks and roof rotting. Second, after the rain stops, the moss prevents the roof material from drying, which further encourages the growth of additional roof destroying organisms.

The most common currently used method for removing moss from roofs involves washing the roof under high pressure and then treating the roof with an oil-based sealer and/or U-V blocking agent such as zinc. During pressure washing, water is applied to the roof material at a pressure of approximately 2500 to 3500 pounds per-square-inch. Pressure washing removes most of the moss, but at the same time tears away the outer roof material. After pressure washing, the roof is thinner by as much as an eighth to a quarter of an inch. Thus, pressure washing removes years of useful life from the roof by literally removing the exposed outer surface of the roof material. Furthermore, after pressure washing, the former roof material must be cleaned out from gutters and off siding, windows, lawns, shrubs and sidewalks.

After pressure washing, oil-based sealing agents are applied to the roof material. It is believed that treatment with "replenishing oils" seals the roof against further weathering. However, the natural oil coating may actually provide an additional food source for moss. Furthermore, the petroleum-based oil products are likely to be oxidized (broken down) by sunlight, reducing the life of the oil, while increasing the flammability of the roof.

Another moss growth prevention method used after pressure washing involves metal based treatments. Typically, a zinc or other metal based solution is applied to the roof. However, these zinc and other metal based solutions are environmentally unsafe and often damage glitters, stain concrete, and poison the surrounding landscape.

The use of metals such as zinc and copper, to kill lichens, such as algae and fungi, on roof is described in Little, U.S. Pat. No. 3,888,684. Specifically, Little describes granules coated with an inner and outer coating, each such coating containing algicidal compounds, such as zinc and copper ions. When exposed to moisture, the granules' inner and outer coatings leach the zinc and copper ions to produce a bimetallic effect to retard the growth of lichens, such as algae and fungi. The copper and zinc containing granules disclosed in Little have the disadvantage of being environmentally toxic. In addition, the granules themselves are easily washed off the roof by rain, thereby rendering the granules ineffective.

Lodge, U.S. Pat. No. 3,998,644, also describes a metal based roof coating for preventing algae growth. Specifically, Lodge describes an alkaline metal silicate with zinc hydroxychloride dispersed in a solution. The composition is applied to a roof, forming a hard coating on the roof. The zinc metal based treatment described in Lodge has the disadvantage of being environmentally toxic. An additional drawback is that the hard coating may break down during weathering, leaving portions of the roof unprotected.

No one has previously disclosed an environmentally compatible penetrant composition which is effective for preventing moss growth on roofs.

Therefore, objects of the present invention are to provide a stable, non-oil based, non-toxic, non-flammable composition which does not include toxic metals such as zinc or copper, which is cost effective to produce and apply, and effective for removing moss from numerous different porous weather exposed surfaces, particularly roofs, without pressure washing, without causing deterioration of gutters or downspouts, without harming plants or animals, resulting in a lengthening of the life of the weather exposed surface.

SUMMARY OF THE INVENTION

The penetrant composition of the present invention, for applying to and penetrating into porous weather exposed surfaces to prevent moss growth, is preferably an aqueous solution, having a pH of at least 11.0, containing $Na_2O$ and $SiO_2$ at a combined concentration between 10% and 30% (W/V) (throughout the specification "(W/V)" means weight per volume, for example, grams/milliliters) and a surfactant composition for increasing the permeability of the penetrant composition into the exposed surface without causing the $Na_2O$ and $SiO_2$ to precipitate. The invention further includes a method of preventing moss growth on a weather exposed surface. A preferred method of the present invention involves spraying the penetrant composition onto a roof at a rate of approximately one gallon of penetrant composition per 100 square feet of surface.

DETAILED DESCRIPTION OF THE INVENTION

The invention involves a penetrant composition for applying to and penetrating into weather exposed surfaces to prevent moss growth. The penetrant composition is principally an aqueous solution containing $Na_2O$ and $SiO_2$. A preferred formulation of the penetrant composition includes a surfactant capable of increasing the permeability of the composition into the exposed surface material without causing the $Na_2O$ and $SiO_2$ to precipitate. The solution typically has a $SiO_2/Na_2O$ weight ratio in the range of 1.5 to 3.3, and preferably a weight ratio of 3.2. The pH of the solution is at least 11.0 and preferably 11.3.

Sodium silicate stock solutions can be obtained from the PQ Corporation, industrial chemicals division, under the trademark product names STIXSO RR®, N®, E®, O®, K®, N®, STAR®, RU®, V®, C®, STARSO®, and B-W®. In the preferred embodiment the N type sodium silicate solution is diluted with water in a one to one volume ratio.

Sodium silicate solutions are generally inexpensive in comparison to the metal based compounds which have been used on roofs in the past. In addition, sodium silicate residue which remains after a solution is applied to a surface and has dried is non-flammable, resistant to temperatures up to 3000° F., odorless, non-toxic and moisture resistant.

When the silicate solutions are completely dehydrated, they provide excellent resistance to high temperature. Most silicates used for binders have softening points at approximately 1200° F. and flow points of 1500° F. to 1600° F. This temperature resistance reduces the flammability of any material into which the silicate solution has permeated. Furthermore, the soluble silicates are ideal for impregnating fibrous materials, particularly building materials. In addition to the fireproofing qualities, silicate adhesives provide good wet strength as well as dry bond strength, and excellent overall adhesion.

Sodium silicates are made from sand and alkali and are universally judged to be non-toxic and ecologically harmless in fresh water environments. They are completely inorganic and therefore do not present hazards of explosion or flammability.

Thus, weather exposed material into which a sodium silicate solution has penetrated, is more resistant to high temperatures, is less flammable and has increased material strength, as a result of the sodium silicate solution. In addition, the sodium silicate impregnated weather exposed material has no increased toxicity or environmentally harmful characteristics.

The penetrant composition of the present invention includes a surfactant composition which increases the permeability, or penetration, of the composition into the weather exposed material without causing the sodium silicate to precipitate. The surfactant composition wets the solution and acts as a carrier, increasing the permeability of the penetrant composition into pores of the exposed surface material. The preferred surfactant composition is a blend of hydrotope surfactants (chemicals which have the property of increasing the aqueous solubility of slightly soluble organic chemicals), and/or including an amide surfactant (chemicals which have the property of increasing the aqueous solubility of meta-silicates in solution). In the preferred embodiment, the surfactant is BIOSOFT LD-190® (a registered U.S. trademark), a detergent concentrate sold by Stepan and by Van Waters & Rogers Inc., a subsidiary of Univar. Typically 1.5 gallons of BIOSOFT LD-190® surfactant is added to 550 gallons of the sodium silicate solution. BIOSOFT LD-190® surfactant is a clear to hazy yellow liquid of 90% to 93% solids, has a pH of approximately 8.5, a viscosity of 350 centipoise, and is not believed to be a hazardous material under current Department of Labor definitions. Another surfactant which has been found to work is BIOSOFT LD-95® surfactant, sold by the same manufacturers. Typically 2.0 gallons of BIOSOFT LD-95® surfactant is added to 550 gallons of the sodium silicate solution. BIOSOFT LD-190® surfactant is preferred over BIOSOFT LD-95® surfactant because only 1.5 gallons of BIOSOFT LD-190® surfactant is required, compared to 2.0 gallons of BIOSOFT LD-90® surfactant to achieve the same penetration into roof materials the concentration of surfactant in the penetrant composition is preferably between approximately 0.20% and 0.50% (V/V) (throughout the specification, "(V/V means volume per volume, for example, milliliters/milliliters).

The surfactant acts as a wetting agent by decreasing the viscosity of the solution and altering the surface tension of the solution thereby promoting penetration of the composition into the surface pores. The surfactant must be carefully selected so that it does not force the sodium silicate to precipitate out of the solution which would defeat the purpose of using a surfactant. The preferred surfactant, BIOSOFT LD-190® surfactant, produces a stable solution with the sodium silicate such that the sodium silicate does not precipitate out of solution when the surfactant is added.

The composition may further include a colorant, such as tartazine, which turns the composition from its normal colorless state to a bright yellow color. Adding such a colorant increases the safety of handling the composition because the composition can be readily seen and can be readily distinguished from water or undiluted sodium silicate solution.

In a preferred embodiment, the penetrant composition comprises about 4.5% (W/V) $Na_2O$ and 14.3% (W/V) $SiO_2$ in water. The desired sodium silicate solution is produced by mixing one part water with one part of the N® type sodium silicate stock solution as provided by the PQ Corporation. Through experimentation, the results of which are given below, the inventor has found that the above mentioned sodium silicate concentration is preferable because if the sodium silicate concentration is too high, the solution is too viscous which makes it difficult to apply and prevents it from penetrating adequately. If the sodium silicate solution is too low the solution is too dilute resulting in an inadequate quantity of sodium silicate being deposited per unit area. The surfactant composition, preferably 1.5 gallons of BIOSOFT LD-190® surfactant, is added to 550 gallons of the silicate solution mixture before the penetrant composition is applied to a surface.

In the method of the present invention the penetrant composition described above is applied to a roof in an amount of approximately 1 gallon of penetrant composition per 100 square feet of roof. The composition is then allowed to dry on the roof at ambient temperatures. Typically, southern and western exposed surfaces are more weathered, e.g., more porous, than northern and eastern exposed surfaces. South and west exposed wooden roofs have more dry rot and sun blisters than north and east exposures, which may result in cracked and warped surfaces. Due to the increased weathering on the south and west exposures, typically, 1.5 gallons of penetrant is applied per 100 square feet of surface. On the north and east surfaces, 0.75 gallons are applied per 100 square feet, resulting in an average of 1.0 gallons per 100 square feet for the entire roof.

The moss preventative method of the present invention may be widely used on a variety of porous surfaces such as roofing materials including, but not limited to, wood shake, composition, ceramic, tile, etc., many types of siding, concrete walls or sidewalks, docks, fences, asphalt, retaining walls, concrete bridges or any other weather exposed surface which is porous and tends to support moss growth. In addition, the present invention may be used to spray trees and shrubs having moss or other parasitic growth thereon. Typically, trees are sprayed during the winter after the trees' leaves have dropped.

It is believed that the penetrant composition prevents moss growth on such surfaces by establishing a highly alkaline environment of pH 11.0 or greater. Moss cannot grow in such an alkaline environment and quickly dies. Consequently, the treatment is effective for both the purposes of killing existing moss and preventing further moss growth. The composition is applied to the surface to be protected and penetrates into the pores of the surface. After penetration, the composition dries by evaporation, setting the composition in the surface material. Once set in the pores of the material, the composition maintains a pH level of 11.0 or greater, thereby killing existing moss and preventing further moss growth in or on the surface material.

When applying the inventive composition to asphalt roofs having a granule-type surface, approximately 0.5 gallons per 100 square feet is used. Less of the penetrant composition per square foot is used than on wooden roofs because asphalt is much less porous than wood. Approximately 1 gallon of penetrant is applied to tile roofs per 100 square feet of surface because tile roofs have approximately the same porosity as wood. Approximately 0.75 gallon of penetrant is applied to concrete per 100 square feet of surface.

In a preferred method, the penetrant composition is applied by pumping and spraying the composition onto the roof. A diaphragm pump is advantageous for this purpose so that the composition does not come in contact with the working mechanisms of the pump, and therefore cannot crystalize and clog the pump.

Once applied to an exposed surface having moss growing thereon, the penetrant composition kills the moss in a short period of time. When the penetrant composition is applied to wooden roofs at an ambient temperature of 95° F., the moss is killed and turns brown within one minute. When the ambient temperature is 70° F. and the sky is sunny, the moss is killed and turns brown in ten minutes or less. When the ambient temperature is 70° F. and the sky is cloudy, the moss may take up to one hour to die and turn brown.

Dead moss typically washes away with rain. On old wooden roofs, having worn, highly porous surfaces, the moss may be washed off in one or two rainy seasons. For wooden roofs under 15 years of age, only half a rainy season may be required to wash away the dead moss. A wooden roof only one or two years old may be washed clean in one heavy rain. A customer may speed up moss removal by spraying the roof with water from a garden hose. On old asphalt roofs, moss is typically removed in one to two rainy seasons. On old tile roofs, moss is typically washed away in one rainy season. On concrete surfaces, such as retaining walls and driveways, the moss can be washed away almost immediately with a garden hose.

Before spraying a surface with the penetrant composition, the surface must be dry to the touch. If the surface is wet, the penetrant composition cannot penetrate the already water-filled pores and the composition merely runs off the surface. Typically, such wet surfaces dry overnight, allowing application of the inventive composition during the following afternoon.

The sodium silicate, in undiluted stock form (8.90% $Na_2O$ and 28.7% $SiO_2$) penetrates wood roofs to a depth of approximately 1/16-inch. When the sodium silicate stock solution is diluted one to one with water, the mixture penetrates wood roofs to a depth of 3/16-inch. Diluting the stock solution decreases the viscosity of the sodium silicate, facilitating the increased penetration. The preferred penetrant composition, including sodium silicate and surfactant (0.27% BIOSOFT LD-190 ® surfactant) at the preferred concentrations, penetrates wood roofs to a depth of 5/16-inch. The surfactant wets the sodium silicate solution, further increasing the penetration of the penetrant composition.

Further penetration of the penetrant composition into a porous surface can be achieved by pressure treatment. For example, a wood shake which is intended for use on a roof is put into a pressure chamber where the pressure is lowered substantially below ambient atmospheric pressure. The penetrant composition of the present invention is added to the pressure chamber. Next, the pressure in the chamber is raised causing the penetrant composition to be forced deeply into the pores of the shake. It is believed that surfaces which are pressure treated with the penetrant composition of the present invention would be resistant to moss growth throughout the useful life of the material.

The inventor has conducted numerous experiments regarding his invention. Specifically, the inventor has applied the inventive composition to exposed surfaces, and has observed the surfaces for several years. During this observation period, the inventor has noted the effects of weathering and the durability of the surfaces to which the composition has been applied. The inventor has also noted the growth, or lack of growth, of moss on roofs under varying conditions and in different geographical locations. The inventor has compared the test surfaces with control surfaces which have not received an application of the inventive composition. The inventor has applied the penetrant composition to one-half of a surface, to allow a direct side-by-side experimental comparison between the treated half and the nontreated half. In addition, the inventor has experimented by trying numerous dilutions of the sodium silicate solution, numerous types of surfactants, and has applied the penetrant composition to numerous types of weather exposed materials. A summary of the most pertinent experiments are given below.

EXPERIMENT 1

In a first set of experiments, the inventor varied the concentration of sodium silicate in the penetrant composition. The inventor determined that compositions comprising less than approximately 10% (W/V) sodium silicate were inadequately effective for preventing moss growth. The inventor believes that the reason for this is that there is a limited amount of absorbent capacity for a given surface, at least partially depending on the number and size of the pores; and that simply spraying a larger volume of a more dilute solution does not result in the desired post-dehydration amount of solids because after the surface is saturated, excess solution tends to run off the surface. In order to achieve the desired surface environment having a pH of at least 11.0 by using a sodium silicate solution of less than 10% (W/V) it is necessary to apply multiple coats with drying steps between each coat which is impractical and costly. Such dilute solutions would also require a longer drying time, also called evaporation time, to set the composition in the surface material. The inventor also found that solutions with more than approximately 30% (W/V) were inadequately effective because the solution was too viscous to effectively penetrate the roof and it tended to clog pumps and sprayers.

EXPERIMENT 2

In a second set of experiments, the inventor varied the type of surfactant composition, while holding the concentration of sodium silicate constant. The results of these experiments are shown below in Table 1. (Column 2 represents the number of gallons of surfactant added to 550 gallons of pure water/sodium silicate mixture).

TABLE 1*

| Surfactant | Hydrotopic Blend | Volume Added | Amide | Increased Penetration | Stability |
| --- | --- | --- | --- | --- | --- |
| BIOSOFT LD-190 ® | yes | 1.5 gal. | yes | yes | yes |
| BIOSOFT LD-95 ® | yes | 2.0 gal. | yes | yes | yes |
| BIOTERGE 804 ® | no | 1.5 gal. | no | no= | no |
| BIOTERGE AS40 ® | no | 1.5 gal. | no | no= | no |
| BIOTERGE DAS85 ® | no | 1.5 gal. | no | no= | no |
| WET 9N9 ® | no | 1.5 gal. | no | no= | no |

*all surfactants listed are believed to be registered U.S. trademarks
=after formation of sodium silicate precipitate The surfactants which are not blends of hydrotopes or amides caused the sodium silicate to precipitate, i.e., the surfactants did not produce a stable penetrant composition. Thus, these surfactants did not achieve the desired result of wetting the sodium silicate solution and did not increase the penetration of the composition into the surface material to be protected because they caused the sodium silicate to precipitate. In contrast, the two listed hydrotopic blend surfactants, particularly BIOSOFT LD-190 ®, increased the permeability of the composition into surface materials to be protected by as much as 2/16 of an inch without forcing the sodium silicate out of solution. The increased penetration of the composition resulted in increased protection against moss growth on the exposed surface. The inventor also found that less BIOSOFT LD-190 ® was required compared to BIOSOFT LD-95 ® to achieve the same penetration enhancing qualities.

EXPERIMENT 3

In a third set of experiments, the inventor investigated the effectiveness of the invention on a range of different weather exposed surface types. Specifically, the inventor applied the inventive composition to wooden or shake style roofs, composition roofs, tile roofs and asphalt roofs. The inventor also applied the penetrant composition to patios, fencing, wood siding, docks, driveways and concrete work including retaining walls, patios and sidewalks. Through such experiments, the inventor has determined that the inventive composition and method prevents moss growth on all such listed surfaces by penetrating into and setting in the pores of the surfaces. The inventor has found that the penetrant composition kills moss and prevents further moss growth on all such surfaces.

Various modifications and alterations of this invention will be obvious to those skilled in the art without departing from the spirit and scope of this invention, and it should be understood that the claimed invention is not limited to the illustrative embodiments set forth herein. For example, the inventive composition has other beneficial effects such as killing lichens including fungus.

What is claimed is:

1. A penetrant composition for applying to and penetrating into a porous weather exposed surface material to prevent moss growth and to render the surface fire resistant, the composition consisting essentially of:
    an aqueous solution having a pH of at least 11.0 containing a weight ratio of $SiO_2$ and $Na_2O$ in the range Of 1.5 to 3.3 wherein the combined concentration of $Na_2O$ and $SiO_2$ in the solution is between 10% and 30% (W/V);
    a surfactant composition including an amide moiety which is capable of increasing the permeability of the penetrant composition into the surface material without causing the $Na_2O$ and $SiO_2$ to precipitate; and
    a colorant in sufficient concentration to visibly color the composition.

2. The composition of claim 1 wherein the concentration of the surfactant composition in the penetrant composition is approximately between 0.20% and 0.50% (V/V).

3. The penetrant composition of claim 1 wherein the surfactant composition is a blend of hydrotopic surfactants.

4. A penetrant composition for applying to and penetrating into a porous weather exposed surface material to prevent moss growth and to render the surface fire resistant, the composition comprising:
    an aqueous solution having a pH of at least 11.0 containing $Na_2O$ and $SiO_2$ wherein the combined concentration of $Na_2O$ and $SiO_2$ is between 10% and 30% (W/V); and
    a surfactant composition which is capable of increasing the permeability of the penetrant composition into the surface material without causing the Na2O and $SiO_2$ to precipitate, wherein the surfactant composition includes an amide.

5. A penetrant composition for applying to and penetrating into a porous weather exposed surface material to prevent moss growth and to render the surface fire resistant, the composition comprising:
    an aqueous solution having a pH of at least 11.0 containing $Na_2O$ and $SiO_2$ wherein the combined concentration of $Na_2O$ and $SiO_2$ is between 10% and 30% (W/V); and
    a surfactant composition which is capable of increasing the permeability of the penetrant composition into the surface material without causing the $Na_2O$ and $SiO_2$ to precipitate, wherein the composition further comprises a colorant.

6. A penetrant composition for applying to and penetrating into a porous weather exposed surface material to prevent moss growth thereon, the composition consisting essentially of water, $Na_2O$, $SiO_2$ and a blend of hydrotopic surfactants for increasing the permeability of the composition into the surface material wherein the pH of the composition is at least 11.0.

7. A method of preventing moss growth on a porous weather exposed surface material, the method comprising the steps of:
   providing an aqueous penetrant solution having a pH of at least 11.0 comprising $Na_2O$ and $SiO_2$ at a combined concentration between 10% and 30% (W/V);
   spraying approximately 1 gallon of the solution per 100 square feet on the surface material to be protected; and
   allowing the solution to dry on and in the surface material at ambient temperatures.

8. The method of claim 7 further comprising a step of adding a surfactant composition to the penetrant solution, wherein the surfactant composition is capable of increasing penetration of the penetrant solution into the surface without causing the $Na_2O$ and $SiO_2$ to precipitate.

9. The method of claim 8 wherein the surfactant composition is a blend of hydrotopic surfactants.

10. The method of claim 9 wherein the concentration of surfactant composition in the penetrant solution is approximately between 0.20% and 0.50% (V/V).

11. The method of claim 7 wherein the solution has a weight ratio of $SiO_2$ to $Na_2O$ in the range of 1.5 to 3.3.

12. The method of claim 7 wherein the penetrant solution consists essentially of a weight ratio of $SiO_2$ and $Na_2O$ in the range of 1.5 to 3.3, and the combined concentration of $Na_2O$ and $SiO_2$ in the solution is between 10% and 30% (W/V).

13. A method of preventing parasitic growth on a porous weather exposed surface material, the method comprising the steps of:
   providing an aqueous penetrant solution having a pH of at least 11.0 comprising $Na_2O$ and $SiO_2$ at a combined concentration between 10% and 30% (W/V);
   adding a surfactant composition to the penetrant solution, wherein the surfactant composition includes an amide and is capable of increasing penetration of the penetrant solution into the surface without causing the $Na_2O$ and $SiO_2$ to precipitate;
   spraying approximately 1 gallon of the solution per 100 square feet on the surface material to be protected; and
   allowing the solution to dry on and in the surface material at ambient temperatures.

14. A method of preventing parasitic growth on a porous weather exposed surface material, the method comprising the steps of:
   providing an aqueous penetrant solution having a pH of at least 11.0 comprising $Na_2O$ and $SiO_2$ at a combined Concentration between 10% and 30% (W/V);
   spraying approximately 1 gallon of the solution per 100 square feet on the surface material to be protected wherein the solution is applied to the surface material to be protected through a diaphragm pump; and
   allowing the solution to dry on and in the surface material at ambient temperatures.

15. A method of preventing parasitic growth on a porous weather exposed surface material, the method comprising the steps of:
   enclosing the porous material in a pressure chamber;
   lowering the pressure in the chamber substantially below one atmosphere;
   providing an aqueous penetrant solution having a pH of at least 11.0 comprising $Na_2O$ and $SiO_2$ at a combined concentration between 10% and 30% (W/V);
   contacting the porous material with the penetrant solution; and
   significantly increasing the pressure in the chamber so that the penetrant solution is driven deeply into the pores of the material.

* * * * *